US007083308B2

(12) United States Patent
Kenyon et al.

(10) Patent No.: US 7,083,308 B2
(45) Date of Patent: Aug. 1, 2006

(54) STRUCTURAL REINFORCING BRACKET FOR A LUMINAIRE HOUSING

(75) Inventors: Lewis W. Kenyon, Blacksburg, VA (US); Ralph W. Sutherland, Blacksburg, VA (US)

(73) Assignee: Hubbell Incorporated, Orange, CT (US)

( * ) Notice: Subject to any disclaimer, the term of this patent is extended or adjusted under 35 U.S.C. 154(b) by 152 days.

(21) Appl. No.: 10/804,211

(22) Filed: Mar. 19, 2004

(65) Prior Publication Data

US 2005/0207169 A1 Sep. 22, 2005

(51) Int. Cl.
*B60Q 1/00* (2006.01)

(52) U.S. Cl. ...................... 362/374; 362/362; 362/368; 362/457

(58) Field of Classification Search ................ 362/147, 362/223, 374, 375, 368, 362, 404, 370, 217, 362/219, 457
See application file for complete search history.

(56) References Cited

U.S. PATENT DOCUMENTS 3,040,926 A 6/1962 Palmer
3,739,319 A 6/1973 Garnett
4,062,470 A 12/1977 Boteler
4,138,716 A * 2/1979 Muhlethaler et al. ....... 362/375
4,141,061 A 2/1979 Ford
4,319,313 A 3/1982 Eberhart
4,379,321 A 4/1983 Plemmons
6,047,936 A * 4/2000 Favotto et al. ........... 248/309.1
6,116,556 A * 9/2000 Roth ....................... 248/218.4
6,207,894 B1 3/2001 Reiker
6,848,813 B1 * 2/2005 Patz et al. .................. 362/432

* cited by examiner

*Primary Examiner*—Alan Cariaso
*Assistant Examiner*—James W Cranson, Jr.
(74) *Attorney, Agent, or Firm*—Alfred N. Goodman; Mark S. Bicks; Marcus R. Mickney

(57) ABSTRACT

A luminaire housing transfers mechanical loads and stresses imparted by an electrical power supply through a bracket to a support, thereby preventing damage to the luminaire housing. The luminaire housing has an aperture that is adapted to receive the electrical power supply. A first fastener hole in the luminaire housing is adapted to receive a first fastener to secure the luminaire housing to the support. A bracket has a first opening aligned with the luminaire housing aperture and a second opening aligned with the first fastener hole.

27 Claims, 4 Drawing Sheets

STRUCTURAL REINFORCING BRACKET FOR A LUMINAIRE HOUSING

FIELD OF THE INVENTION

The present invention relates to an assembly for structurally reinforcing a luminaire housing. More particularly, the present invention relates to a bracket that structurally reinforces the luminaire housing. Still more particularly, the present invention relates to a luminaire housing having a bracket that receives an external power supply and transfers the mechanical loads and stresses to a supporting structure to which the luminaire housing is secured. The bracket assembly prevents damage to the luminaire housing caused by the mechanical loads and stresses imparted by the external power supply.

BACKGROUND OF THE INVENTION

Luminaire housings are frequently used in the lighting industry, such as in hazardous locations. UL (Underwriters Laboratories Inc.) and CSA (Canadian Standards Association) have stringent requirements regarding the mechanical strength of luminaire housings, particularly non-metallic luminaire housings. Those standards are even more difficult to meet when power is supplied through a rigid power supply or conduit. A rigid conduit imparts more mechanical loads and stresses to the luminaire housing than a flexible conduit. These mechanical loads and stresses include torque, tension and bending loads. The requirements are based on worst case loads being applied to the conduit/hub attachment portion of the luminaire housing during the installation process.

Luminaire housings are generally thin-walled and lightweight structures that are susceptible to damage. Thus, non-metallic and thin-walled metallic luminaire housings are especially prone to damage if they are not able to handle the mechanical loads and stresses imparted by the power supply conduit. The likelihood of damage is even greater when power is supplied through a rigid conduit since there is no flexibility in the conduit to absorb some of the mechanical loads and stresses, thereby passing all the mechanical loads and stresses into the luminaire housing. Non-metallic and thin-walled metallic luminaire housings are highly susceptible to breaking under these mechanical loads and stresses, which could also cause injury to personnel working in the area as well as possibly damaging the electrical system.

One possible solution to strengthening luminaire housings is to make the luminaire housings more rigid by such means as increasing the thickness of the housing walls or strengthening the mounting hardware. However, to do so results in a luminaire housing that is more complex and expensive to manufacture, particularly the increased cost of the fixture housing and tooling costs. Furthermore, increasing the thickness of the housing walls increases the weight of the luminaire assembly, as well as increasing the mechanical structures needed to support the luminaire assembly. A need exists for a luminaire housing assembly that is able to handle the mechanical loads and stresses imparted by the electrical power supply, while remaining relatively inexpensive and easy to manufacture.

Examples of existing brackets for supporting luminaire housings are disclosed in the following U.S. Pat. No. 3,739,319 to Garnett; U.S. Pat. No. 4,062,470 to Boteler; U.S. Pat. No. 4,138,716 to Muhlethaler et al.; U.S. Pat. No. 4,379,321 to Plemmons et al.; and U.S. Pat. No. 6,207,894 to Reiker.

Thus, there is a continuing need to provide improved luminaire housing assemblies.

SUMMARY OF THE INVENTION

Accordingly, it is a primary objective of the present invention to provide an improved luminaire housing assembly.

A further objective of the present invention is to provide a structural reinforcing bracket for a luminaire housing assembly.

Another objective of the present invention is to provide a luminaire housing that is lighter and less expensive than rigid and thick-walled luminaire housings.

Another objective of the present invention is to provide a thin-walled non-metallic luminaire housing that meets the UL and CSA certification requirements for use in hazardous locations.

A further objective of the present invention is to provide a bracket for a luminaire housing assembly that prevents damaging the luminaire housing by transferring mechanical loads and stresses imparted by the power supply conduit through a bracket to the support structure to which the luminaire housing is secured.

A still further objective of the present invention is to provide a method of transferring mechanical loads and stresses imparted by the power supply through a bracket and into the support structure to which the luminaire housing is mounted to prevent damaging the luminaire housing.

The foregoing objects are basically attained by providing a luminaire housing assembly that transfers mechanical loads and stresses imparted by the electrical power supply through a bracket to the support, thereby preventing damage to the luminaire housing; the luminaire housing assembly including a luminaire housing having an aperture; a connector received by the aperture adapted to receive an electrical power supply; a first fastener hole in the luminaire housing adapted to receive a first fastener to secure the luminaire housing to a support; a bracket having a first opening aligned with the luminaire housing aperture and a second opening aligned with the first fastener hole.

Other objects, advantages and salient features of the invention will become apparent from the following detailed description, which, taken in conjunction with the annexed drawings, discloses preferred embodiments of the invention.

BRIEF DESCRIPTION OF THE DRAWINGS

Referring now to the drawings that form a part of the original disclosure.

DETAILED DESCRIPTION OF THE INVENTION

Figure 1:
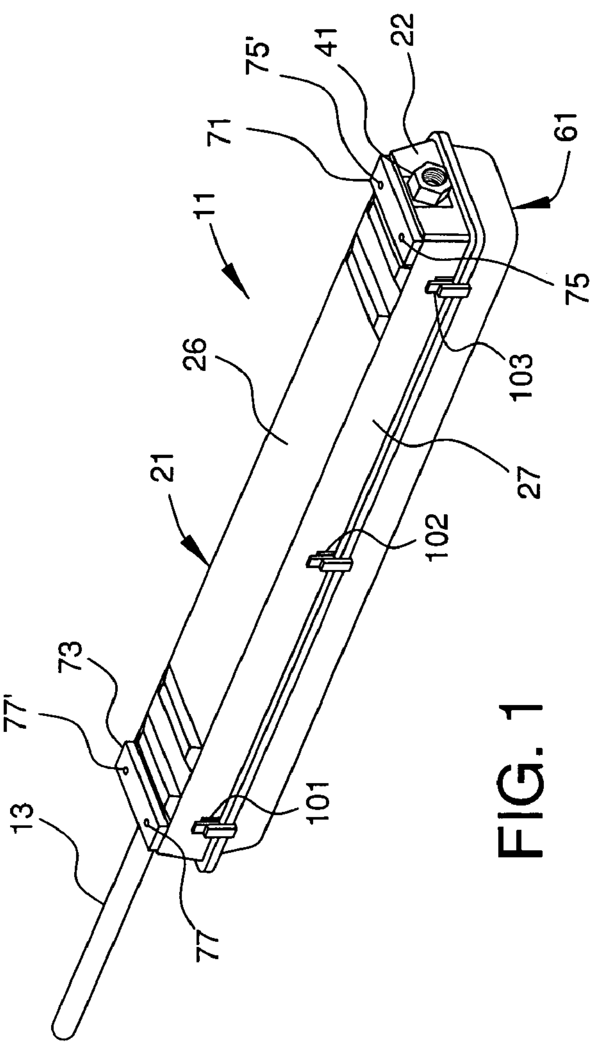
FIG. 1 is a perspective view showing a rigid conduit connected to a luminaire housing assembly according to the present invention.

As shown in FIGS. 1–5, the present invention relates to a luminaire housing assembly 11 that transfers mechanical loads and stresses imparted by the electrical power supply conduit 13 through a bracket 31 to a support 15, thereby preventing damage to the luminaire housing 21. The luminaire housing assembly 11 includes a luminaire housing 21 having an aperture 23. A connector 41 is received by the aperture 23 and is adapted to receive the electrical power supply conduit 13. A first fastener hole 25 in the luminaire housing 21 is adapted to receive a first fastener 51 to secure the luminaire housing to the support 15. A bracket 31 has a first opening 33 aligned with the luminaire housing aperture 23 and a second opening 35 aligned with the first fastener hole 25.

Figure 2:
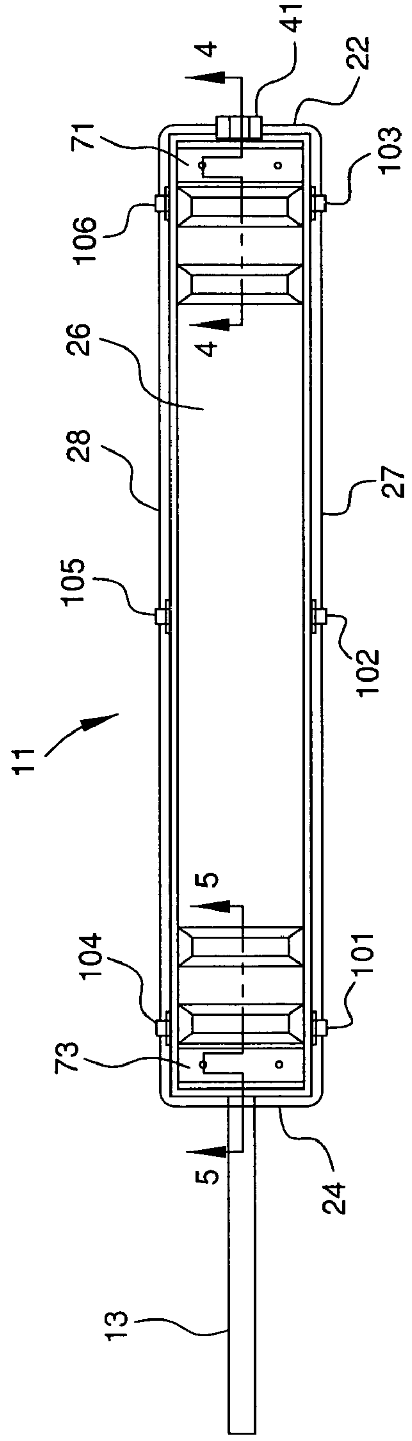
FIG. 2 is a top plan view of the luminaire housing assembly of FIG. 1.
Figure 3:
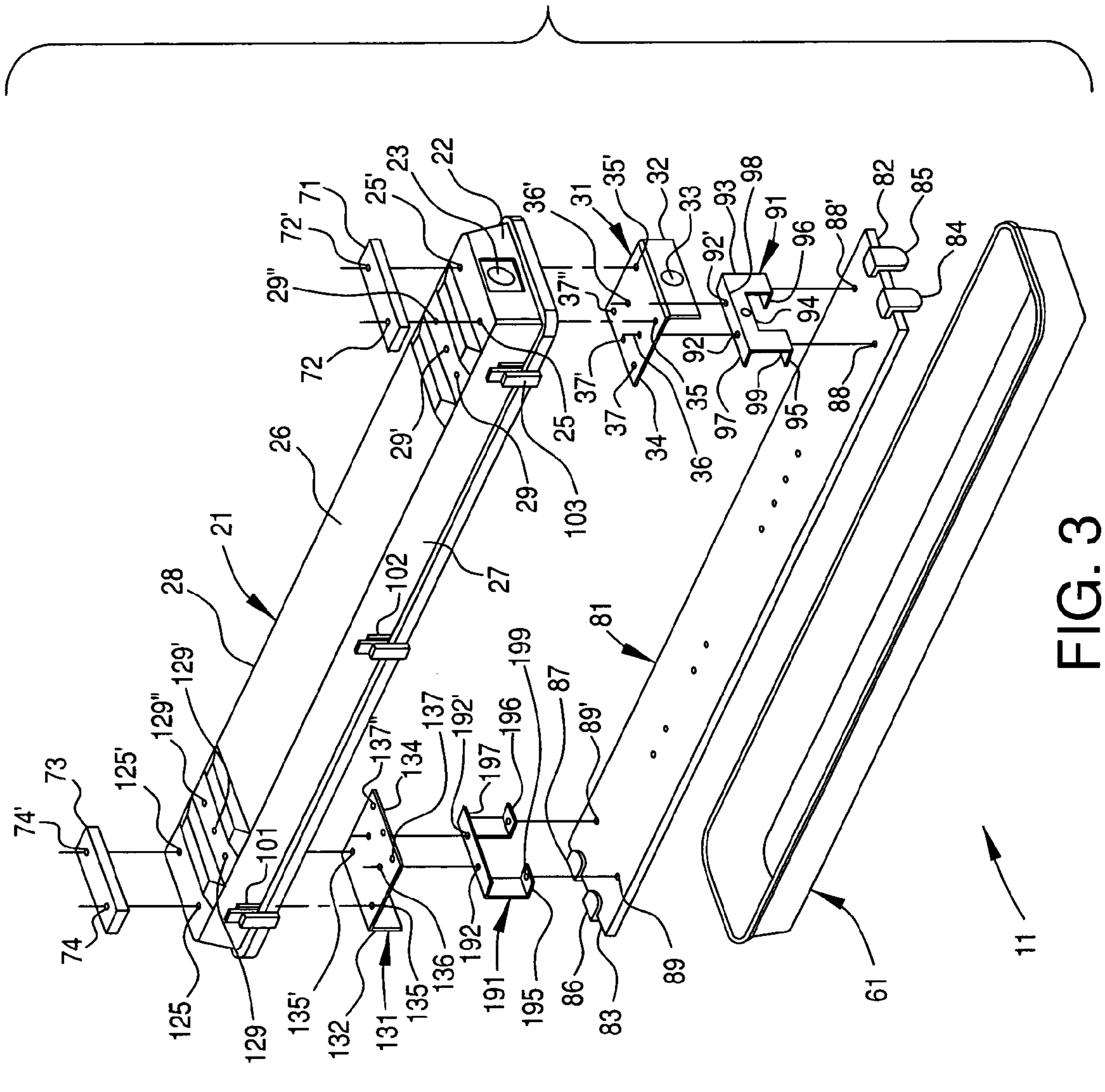
FIG. 3 is an exploded perspective view of the luminaire housing assembly of FIG. 1.
Figure 5:
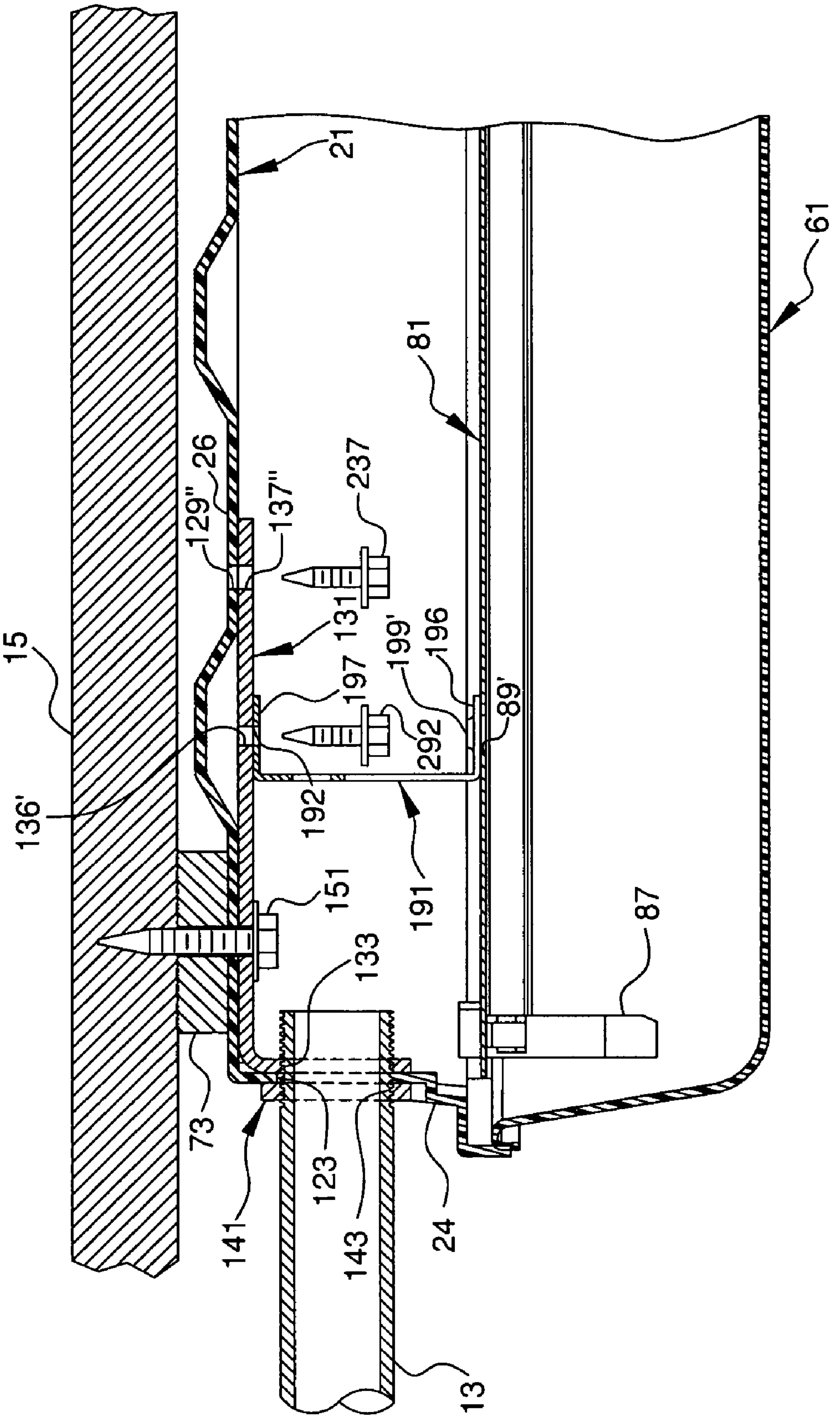
FIG. 5 is an elevational view in cross-section along line 5—5 of FIG. 2, showing a second electrical connector for receiving an electrical conduit.

A luminaire housing 21, as shown in FIGS. 1–3, receives a power supply conduit 13 that supplies electrical power to the housed luminaire lamps (not shown). Any suitable number of lamps may be housed within the luminaire housing, such as, but not limited to, one, two or three lamps. Preferably, the luminaire housing 21 is fragile, such as a thin-walled metal, or non-metallic. The thin-walled metal is preferably corrosion resistant and may be, but is not limited to, aluminum, stainless steel, brass and copper. The luminaire housing has a top wall 26. First end wall 22, second end wall 24, and side walls 27 and 28 extend downwardly from edges of the top wall. The first and second end walls may be substantially parallel to one another, and the side walls 27 and 28 are substantially parallel to one another. Alternatively, the first and second end walls 22 and 24 are angled at approximately 10 degrees. The first end wall 22 has a first aperture 23, and the second end wall 24 has a second aperture 123, as shown in FIGS. 3 and 5, for receiving electrical connectors. The top wall 26 of the luminaire housing 21 has at least one first fastener hole 25 proximal the first end wall 22. Preferably, there are two first fastener holes 25 and 25'. The top wall 26 has at least one second fastener hole 29 to further facilitate securing the first electrical bracket 31 to the luminaire housing 21. Preferably, there are three second fastener holes 29, 29' and 29". The top wall 26 of the luminaire housing 21 has at least third first fastener hole 125 proximal the second end wall 24. Preferably, there are two third fastener holes 125 and 125'. The top wall 26 may have at least one fourth fastener hole 129 to further facilitate securing the second electrical bracket 131 to the luminaire housing 21. Preferably, there are three second fastener holes 129, 129' and 129".

A first electrical bracket 31 transfers mechanical loads and stresses imparted by the electrical power supply conduit 13 through the first bracket 31 to the support 15 to prevent damage to the luminaire housing 21. The first bracket 31 may be of any suitable shape, such as C-shaped or a block, but is preferably substantially L-shaped, as shown in FIG. 3. The first bracket 31 has a first leg 32 and a second leg 34. The first leg 32 is substantially perpendicular to the second leg 34. The first leg abuts the first end wall 22 of the luminaire housing 21. The second leg 34 abuts the top wall 26 of the luminaire housing 21. A first opening 33 in the first leg 32 of the bracket 31 is aligned with the first aperture 23 in the first end wall 22 of the luminaire housing to receive an electrical conduit. At least one second opening 35 in the second leg of the electrical bracket 31 is aligned with the at least one first fastener hole 25 in the top wall 26 of the luminaire housing 21. Preferably, there are two second openings 35 and 35' in the second leg 34 of the first electrical bracket 31. The first electrical bracket 31 may have at least one third opening 36 in the second leg 34 to facilitate receiving a first mounting bracket 91. Preferably there are two third openings 36 and 36'. At least one fourth opening hole 37 in the second leg 34 of the first electrical bracket facilitates securing the electrical bracket 31 to the top wall 26 of the luminaire housing 21. Preferably, there are three fourth openings 37, 37' and 37" in the second leg 34 of the first electrical bracket 31. A second electrical bracket 131 may be positioned at the second end wall 24 of the luminaire housing and is substantially identical to the first electrical bracket 31. Features of the second electrical bracket 131 are assigned reference numbers 100 greater than the substantially identical feature of the first electrical bracket 31.

Figure 4:
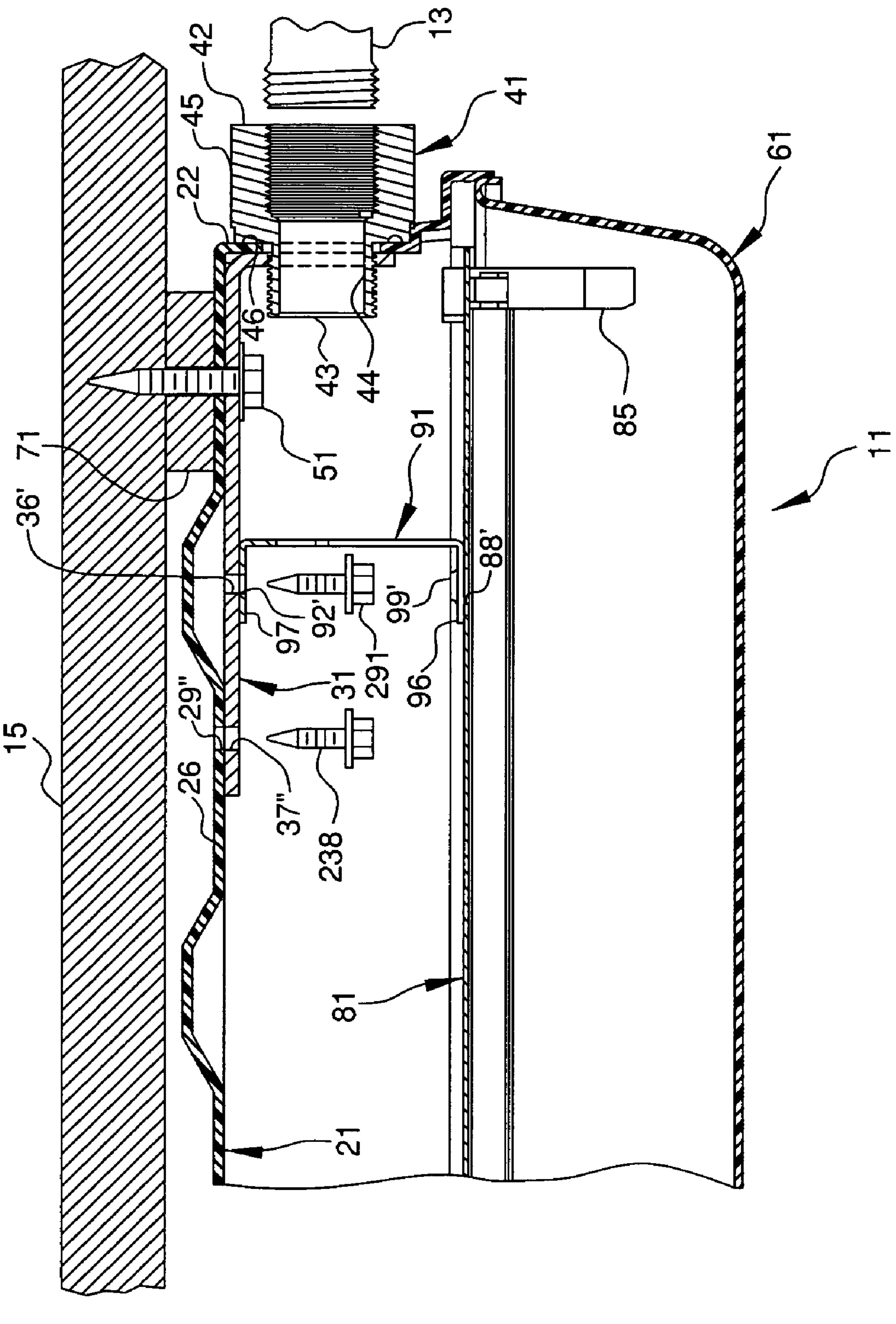
FIG. 4 is an elevational view in cross-section along line 4—4 of FIG. 2, showing a first electrical connector for receiving an electrical conduit.

A first electrical connector 41 is received in the first aperture, as shown in FIGS. 1, 2 and 4. The first electrical connector 41 receives a conduit 13 that supplies electrical power to the lamps in the luminaire housing. The first electrical connector 41 has a first end 42 disposed outside the luminaire housing 21 and a second end 43 disposed within the luminaire housing. An internal passageway 44 connects the first end 42 to the second end 43 of the first electrical connector 41. The portion of the outer wall 45 outside the luminaire housing 21 has a larger diameter than the portion of the inner wall within the luminaire housing, as shown in FIG. 4. A shoulder 46 on the outer wall 45 abuts the first end wall 22 of the luminaire housing 21. A portion of the internal passageway 44 proximal the second end 43 is threaded for receiving the electrical conduit 13. The portion of the outer wall 45 inside the luminaire housing is threaded to facilitate inserting and securing the first electrical connector 41 to the first aperture 23 in the luminaire housing and the first opening 33 in the first bracket 31. An identical first electrical connector 41 may be inserted through the second aperture 123 in the second end wall 24 in the luminaire housing and the first opening 133 in the second bracket 131. Alternatively, a second electrical connector 141 may be used in lieu of the first electrical connector, as shown in FIGS. 1, 2 and 5. The second electrical connector is a locknut 141 having an opening 143 disposed on the outer surface of the conduit 13. Preferably, the locknut is threaded onto the conduit. The conduit 13 is inserted through the second aperture 123 in the second end wall 24 and through the first opening 133 in the second bracket 131 until the locknut 141 contacts the outer surface of second end wall 24 and is securely tight, as shown in FIG. 5. Preferably, the conduit is threaded through the second aperture 123 and the first opening 133 in the second bracket. A sealing type locknut may be used that includes a molded sealant that blocks out water and other contaminants when the luminaire housing assembly 11 is used in a wet and/or hazardous environment.

Ballast tray 81 has a first end 82 and a second end 83, as shown in FIG. 3. Lamp holders 84 and 85 are mounted on the first end 82 of the ballast tray 81, and lamp holders 86 and 87 are mounted on the second end 83 of the ballast tray. Lamps (not shown) are insertable between opposing lamp holders 84 and 86, and 85 and 87. The ballast tray 81 has at least one first fastener hole 88 proximal the first end 82 and at least one second fastener hole 89 proximal the second end 83 of the ballast tray 83. Ballast equipment (not shown) is mounted on the ballast tray 81, and transfers electrical power from the conduit to the lamps.

A first mounting bracket 91 secures the ballast tray 81 to the luminaire housing 21, as shown in FIGS. 3–5. Preferably, the first mounting bracket 91 has a substantially C-shaped cross section, as shown in FIG. 3, but any suitable configuration may be used. The first mounting bracket has a base 93 having a bottom edge 94, from which first and second tabs 95 and 96 extend. A flange 97 extends from the top edge 98 of the first mounting bracket 91 in the same direction as first and second tabs. Each of the first and second tabs has a fastener hole 99 that is aligned with a corresponding fastener hole 88 in the ballast tray 81 to secure the ballast tray to the first mounting bracket 91. A fastener hole 92 in the flange 97 is aligned with a corresponding fastener hole 36 in the first electrical bracket 31 to secure the first mounting bracket 91 and the ballast tray 81 to the first electrical bracket. Preferably, a second mounting bracket 191 that is identical to the first mounting bracket 91 is positioned proximal the second end 83 of the ballast tray 81 to attach the ballast tray to the luminaire housing 21. Features of the second mounting bracket 191 are assigned reference numbers 100 greater than the substantially identical feature of the first mounting bracket 91.

Lens 61, as shown in FIGS. 1 and 3–5. Latches, or snaps, 101 attached to the luminaire housing 21 receive the lens 61. Preferably, side wall 27 of the luminaire housing 21 has three latches 101, 102 and 103 to receive the lens, as shown in FIG. 3. Preferably, side wall 28 of the luminaire housing also has three latches 104, 105 and 106 to facilitate reception of the lens 61, as shown in FIG. 3.

Spacers 71 and 73 are positioned between the top wall 26 of the luminaire housing 21 and the support 15, as shown in FIGS. 3–5. Preferably, spacer blocks are used, but any suitable configuration may be used. The spacer blocks 71 and 73 distance the top wall 26 of the luminaire housing 21 to facilitate transferring the mechanical loads and stresses from the electrical conduits 13, through the brackets 31 and 131 and spacers 71 and 73 and to the support 15. A first spacer block 71 is disposed proximal the first end wall 22 of the luminaire housing 21. The second spacer block is disposed proximal the second end wall 24 of the luminaire housing 21. First spacer block 71 has at least one first fastener hole 72 aligned with corresponding fastener holes in the luminaire housing (fastener hole 25) and in the first electrical bracket (fastener hole 35). Preferably, there are two first fastener holes 72 and 72' in the first spacer block 71. Second spacer block 73 has at least one first fastener hole 74 aligned with corresponding fastener holes in the luminaire housing (fastener hole 125) and in the second electrical bracket (fastener hole 135). Preferably, there are two first fastener holes 74 and 74' in the second spacer block 31.

Preferably, the structural reinforcing bracket is unitarily formed and made of a material having a high modulus of elasticity, such as steel. Preferably the steel has a modulus of elasticity of approximately 29 million psi. Preferably, the luminaire housing is made of a fragile or non-metallic material, such as fiberglass reinforced polyester. Preferably, the spacer is made of a non-metallic material.

Assembly and Disassembly

As shown in FIGS. 1–2 and 4–5, the luminaire housing assembly 11 is shown fully constructed. An exploded view of the non-metallic luminaire housing assembly is shown in FIG. 3.

First electrical bracket 31 is secured to the top wall 26 of the luminaire housing 21, as shown in FIGS. 3 and 4. Fasteners 238 are inserted through the fourth opening holes 37, 37' and 37" in the first electrical bracket 31 and through the second fastener holes 29, 29' and 29" in the top wall 26 of the luminaire housing 21 proximal the first end wall 22. Second electrical bracket is secured to the top wall 26 of the luminaire housing 21, as shown in FIGS. 3 and 5. Fasteners 237 are inserted through the fourth opening holes 137, 137' and 137" in the second electrical bracket 131 and through the second fastener holes 129, 129' and 129" in the top wall 26 of the luminaire housing 21 proximal the second end wall 24.

The ballast tray 81 may then be secured to the first and second electrical brackets 31 and 131, as shown in FIGS. 3–5. Fasteners are inserted through the fastener holes 88 and 88' in the ballast tray and through fastener holes 99 and 99' in the first and second tabs 95 and 96, thereby securing the ballast tray 81 to the first mounting bracket 91. Fasteners are inserted through the fastener holes 89 and 89' in the ballast tray 81 and through fastener holes 199 and 199' in the first and second tabs 195 and 196 proximal the second end wall 24 of the luminaire housing 21, thereby securing the ballast tray 81 to second mounting bracket 191.

Fasteners 291 may then be inserted through fastener holes 92 and 92' in the flange 97 of the first mounting bracket 91 and through the corresponding third openings 36 and 36' in the first electrical bracket 31. Fasteners 292 may be inserted through fastener holes 192 and 192' in the flange 197 of the second mounting bracket 191 and through the corresponding third openings 136 and 136' in the second electrical bracket 31. The first and second mounting brackets 91 and 191 and the ballast tray 81 are secured to the first and second electrical brackets 31 and 131, thereby securing the ballast tray to the luminaire housing 21.

Fasteners 51 are inserted through first openings 35 and 35' in the first electrical bracket 31, through corresponding first fastener holes 25 and 25' in the luminaire housing 21 proximal the first end wall 22, through the fastener holes 72 and 72' in the first spacer block 71 and into the support 15, as shown in FIGS. 3 and 5. Fasteners 151 are then inserted through first openings 135 and 135' in the second electrical bracket 131, through corresponding first fastener holes 125 and 125' in the luminaire housing 21 proximal the second end wall 24, through the fastener holes 74 and 74' in the second spacer block 73 and into the support 15, as shown in FIGS. 4 and 5. The luminaire housing 21, including the first and second electrical brackets 31 and 131, the first and second mounting brackets 91 and 191, the ballast tray 81, and the first and second spacer blocks 71 and 73 are secured to the support 15, such as a ceiling.

Electrical connectors may then be inserted through the first aperture 23 in the first end wall 22 of the luminaire housing 21 and through the first opening 33 in the first electrical bracket 31. First electrical connector 41 is threaded through the first aperture 23 and the first opening 33, as shown in FIG. 4. Alternatively, conduit 13 may be inserted through second aperture 123 in the second end wall 24 of the luminaire housing 21 and through the second opening 133 in the second electrical bracket 131 until the second electrical connector 141 securely tightens against the second end wall of the luminaire housing. Preferably, the same connector type is used at both ends of the luminaire housing 21.

Lamps (not shown) may be connected to the lamp holders 84, 85, 86 and 87. Any number of lamps may be connected, including, but not limited to, one, two or three lamps. The lens 61 may now be snapped into place with the latches 101, 102, 103, 104, 105 and 106 on the luminaire housing 21. Electrical conduits 13 may now be connected to the electrical connectors to supply power to the lamps. The first and second electrical brackets 31 and 131 effectively transfer the mechanical loads and stresses imparted by the conduits 13 through the electrical brackets and into the support 15 away from the luminaire housing 21, thereby preventing damage to the luminaire housing and associated components.

While advantageous embodiments have been chosen to illustrate the invention, it will be understood by those skilled in the art that various changes and modifications may be made therein without departing from the scope of the invention as defined in the appended claims.

What is claimed is:

1. A luminaire housing assembly, comprising:

a luminaire housing having an aperture;

a connector in said aperture adapted to receive an electrical power conduit;

a first fastener hole in said luminaire housing adapted to receive a first fastener to secure said luminaire housing to a support; and a bracket having a first opening aligned with said luminaire housing aperture and a second opening aligned with said first fastener hole.

2. A luminaire housing assembly according to claim 1, wherein said bracket is substantially L-shaped.

3. A luminaire housing assembly according to claim 2, wherein said L-shaped bracket has a first leg and a second leg, said first leg having said first opening and said second leg having said second opening.

4. A luminaire housing assembly according to claim 1, wherein said bracket is made of metal.

5. A luminaire housing assembly according to claim 1, wherein said bracket is made of steel.

6. A luminaire housing assembly according to claim 1, wherein said steel has a modulus of elasticity of approximately 29 million psi.

7. A luminaire housing assembly according to claim 1, wherein said luminaire housing is non-metallic.

8. A luminaire housing assembly according to claim 1, wherein said luminaire housing is made of a fragile material.

9. A luminaire housing assembly according to claim 8, wherein said fragile material is selected from the group consisting of thin-walled aluminum, stainless steel, brass and copper.

10. A luminaire housing assembly according to claim 1, wherein said luminaire housing is made of fiberglass reinforced polyester.

11. A luminaire housing assembly according to claim 1, wherein a spacer is positioned between said luminaire housing and the support, said spacer having a second fastener hole aligned with said first fastener hole in said luminaire housing and said second opening in said bracket and adapted to receive the first fastener.

12. A luminaire housing assembly according to claim 9, wherein said spacer is non-metallic.

13. A luminaire housing assembly according to claim 1, wherein said luminaire housing has a third fastener hole, and said bracket has a third opening aligned with said third fastener hole in said luminaire housing, said third opening and said third fastener hole beign adapted to receive a second fastener to secure said bracket to said luminaire housing.

14. A luminaire housing assembly, comprising:

a luminaire housing having a first end wall and a second end wall, said first and second end walls being connected by first and second side walls and a top wall;

a first aperture in said first end wall and a second aperture in said second end wall of said luminaire housing;

a first fastener hole in said top wall proximal said first end wall of said luminaire housing adapted to receive a first fastener to secure said luminaire housing to a support;

a second fastener hole in said top wall proximal said second end wall of said luminaire housing adapted to receive a second fastener to secure said luminaire housing to a support;

a first bracket having a first opening aligned with said first aperture and a second opening aligned with said first fastener hole;

a second bracket having a third opening aligned with said second aperture and a fourth opening aligned with said second fastener hole;

a first connector received in said first aperture in first end wall and said first opening in said first bracket, said first connector being adapted to receive a first electrical conduit;

a second connector received in said second aperture in said second end wall and said third opening in said second bracket, said second connector being adapted to receive a second electrical conduit;

a first spacer positioned between said luminaire housing and the support structure proximal said first end wall, said first spacer having a third fastener hole aligned with said first fastener hole and said second opening and adapted to receive the first fastener; and a second spacer positioned between said luminaire housing and the support structure proximal said second end wall, said second spacer having a fourth fastener hole aligned with said second fastener hole and said fourth opening and adapted to receive the second fastener.

15. A luminaire housing assembly according to claim 14, wherein each of said first and second brackets are substantially L-shaped.

16. A luminaire housing assembly according to claim 15, wherein each of said first and second substantially L-shaped brackets has a first leg and a second leg, said first legs having said first and third openings adapted to receive said first and second connectors, and said second legs having said second and fourth openings adapted to receive the first and second fasteners.

17. A luminaire housing assembly according to claim 14, wherein said first and second brackets are made of metal.

18. A luminaire housing assembly according to claim 14, wherein said first and second brackets are made of steel.

19. A luminaire housing assembly according to claim 18, wherein said steel has a modulus of elasticity of approximately 29 million psi.

20. A luminaire housing assembly according to claim 14, wherein said first and second spacers are non-metallic.

21. A luminaire housing assembly according to claim 14, wherein a fifth opening in said first bracket is aligned with a fifth fastener hole in said luminaire housing to receive a third fastener to secure said first bracket to said luminaire housing; and a sixth opening in said second bracket is aligned with a sixth fastener hole in said luminaire housing to receive a fourth fastener to secure said second bracket to said luminaire housing.

22. A luminaire housing assembly according to claim 14, wherein said luminaire housing is non-metallic.

23. A luminaire housing assembly according to claim 22, wherein said non-metallic luminaire housing is made of fiberglass reinforced polyester.

24. A luminaire housing assembly according to claim 14, wherein said luminaire housing is made of a fragile material.

25. A luminaire housing assembly according to claim 24, wherein said fragile material is selected from the group consisting of thin-walled aluminum, stainless steel, brass and copper.

26. A method of transferring mechanical loads and stresses in a luminaire housing assembly, comprising the steps of securing a bracket to the luminaire housing;

securing the luminaire housing to a rigid structural support with a fastener extending through the bracket and housing and into the support; and connecting a rigid electrical conduit to a connector secured to the bracket, wherein the bracket transfers mechanical loads and stresses imparted by the conduit through the bracket and into the support to prevent damaging the luminaire housing.

27. A method of transferring mechanical loads and stresses in a non-metallic luminaire according to claim 26, further comprising the steps of spacing the luminaire housing from the structural support with a spacer block.

* * * * *